United States Patent
Sawada

(10) Patent No.: US 8,848,245 B2
(45) Date of Patent: Sep. 30, 2014

(54) PRINTING APPARATUS, METHOD OF GENERATING COLOR CONVERSION TABLE, AND COMPUTER PROGRAM

(71) Applicant: Brother Kogyo Kabushiki Kaisha, Nagoya (JP)

(72) Inventor: Kazuhide Sawada, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 58 days.

(21) Appl. No.: 13/628,043

(22) Filed: Sep. 27, 2012

(65) Prior Publication Data

US 2013/0135683 A1   May 30, 2013

(30) Foreign Application Priority Data

Nov. 30, 2011   (JP) ................................. 2011-261941

(51) Int. Cl.
*H04N 1/405*  (2006.01)
(52) U.S. Cl.
USPC .............................. 358/2.1; 358/504; 358/523
(58) Field of Classification Search
USPC .................... 358/2.1, 1.8–1.9, 500–502, 504, 358/515–520, 523, 529–530
See application file for complete search history.

(56) References Cited

U.S. PATENT DOCUMENTS

| | | | |
|---|---|---|---|
| 5,799,136 A | * | 8/1998 | Li et al. ............................ 358/1.9 |
| 6,344,899 B1 | | 2/2002 | Tabata et al. |
| 2005/0280848 A1 | * | 12/2005 | Seko ................................ 358/1.9 |

FOREIGN PATENT DOCUMENTS

| | | | | |
|---|---|---|---|---|
| JP | H11-078072 A | | 3/1999 | |
| JP | 2007036885 A | * | 2/2007 | |

* cited by examiner

*Primary Examiner* — Thomas D Lee
*Assistant Examiner* — Stephen M Brinich
(74) *Attorney, Agent, or Firm* — Merchant and Gould PC

(57) ABSTRACT

There is provided a print data generating device which generates print data for printing using plural kinds of color material. The device includes a processor, and a memory storing computer-readable instructions which, when executed by the processor, causes the device to perform acquiring pixel data including grayscale values of plural color components corresponding to the plural kinds of color material, acquiring plural limitation values which are determined for the plural color components in the pixel data, respectively, and according to fixing characteristics of color material of the respective color components, to a print medium, determining a total allowable amount in printing a color represented by the pixel data based on the limitation values, correcting the pixel data such that a total amount of color material for the pixel data does not exceed the total allowable amount if needed, and generating the print data based on the corrected pixel data.

11 Claims, 9 Drawing Sheets

| K | Rlim | Glim | Blim | Clim | Mlim | Ylim | GRlim |
|---|---|---|---|---|---|---|---|
| 0 | 458 | 442 | 450 | 255 | 255 | 255 | 534 |
| 64 | 498 | 478 | 488 | 313 | 319 | 317 | 538 |
| 128 | 540 | 516 | 528 | 373 | 381 | 377 | 551 |
| 192 | 564 | 536 | 550 | 430 | 438 | 434 | 543 |
| 255 | 333 | 323 | 327 | 336 | 362 | 348 | 324 |

223,133

PRINTING APPARATUS, METHOD OF GENERATING COLOR CONVERSION TABLE, AND COMPUTER PROGRAM

CROSS-REFERENCE TO RELATED APPLICATION

This application claims priority from Japanese Patent Application No. 2011-261941, filed on Nov. 30, 2011, the entire subject matter of which is incorporated herein by reference.

TECHNICAL FIELD

Aspects of the present invention relate to a technique for limiting a use amount of color material.

BACKGROUND

An inkjet type printing apparatus ejects ink onto a sheet to form ink dots thereby printing an image. There is a known technique for limiting an amount of ink to be ejected onto a sheet in the printing apparatus for suppressing deterioration of print quality (for example, bleeding, strike-through, and the like) due to an excessive amount of ejected ink (for example, JP-H11-78072A or U.S. Pat. No. 6,344,899B). According to this technique, the maximum number of times of repetition ejecting per one dot is set with respect to four kinds of ink to be used for printing (cyan (C), magenta (M), yellow (Y), and black (K)). Specifically, the numbers of times of repetition ejecting of dark K ink and Y ink are limited to 1, and the numbers of times of repetition ejecting of light C ink and M ink are limited to 3.

However, it may be not possible to appropriately limit the amount of ink just by setting the limitation on the amount of ink based on the grayscale level of the color of the ink. For example, in a case where some kinds of ink or some ink combinations are used, if the amount of ink is excessively limited, a color range expressible in the printing apparatus may be narrowed, and if the limitation on the amount of ink is not sufficient, the above-described bleeding and strike-through may occur. These problems are not limited to inkjet type printing apparatuses, but are common to any printing apparatuses using color material.

SUMMARY

Accordingly, an aspect of the present invention provides a technique for appropriately limiting the total amount of color material in a printing apparatus which uses the color material, thereby suppressing deterioration of print quality.

According to an illustrative embodiment of the present invention, there is provided a print data generating device configured to generate print data for a print performing unit which is configured to perform printing on a print medium using a plurality of kinds of color material. The print data generating device comprises a processor, and a memory storing computer-readable instructions therein, the computer-readable instructions, when executed by the processor, causing the print data generating device to perform:

acquiring pixel data which configures image data representing a print image and which includes grayscale values of a plurality of color components corresponding to the plurality of kinds of color material;

acquiring a plurality of limitation values which are determined for the plurality of color components included in the pixel data, respectively, and which are determined according to fixing characteristics of color material corresponding to the respective color components, to the print medium;

determining a total allowable amount using the plurality of limitation values, the total allowable amount being a total amount of color material allowable in printing a color represented by the pixel data;

if a total amount of color material for the pixel data exceeds the total allowable amount, correcting the pixel data such that the total amount of color material for the pixel data does not exceed the total allowable amount; and generating the print data for printing the print image while using the corrected pixel data.

According to the above configuration, the limitation values determined according to the fixing characteristics of the color material to the print medium are used to determine the total allowable amount of the color material allowable in printing colors represented by the pixel data. Also, since the pixel data is corrected such that the total amount of color material based on the pixel data does not exceed the total allowable amount, it is possible to appropriately limit the total amount of color material, thereby suppressing deterioration of print quality.

According to another illustrative embodiment of the present invention, there is provided a method of generating a color conversion table for a print performing unit which is configured to perform printing on a print medium using a plurality of kinds of color material. The method comprises:

(a) preparing correspondence data in which each of a plurality of first color data represented in a first color system is associated with second color data including grayscale values of a plurality of color components corresponding to the plurality of color material;

(b) preparing a plurality of limitation values which are determined for the plurality of color components included in the second color data, respectively, and which are determined according to fixing characteristics of color material corresponding to the respective color components, to the print medium;

(c) determining a total allowable amount using the plurality of limitation values, the total allowable amount being a total amount of color material allowable in printing a color represented by the second color data;

(d) if a total amount of color material for the second color data exceeds the total allowable amount, correcting the second color data such that the total amount of color material for the second color data does not exceed the total allowable amount; and (e) generating corrected correspondence data by correcting the correspondence data while using the corrected second color data.

According to the above configuration, the limitation values determined according to the fixing characteristics of the color material to the print medium are used to determine the total allowable amount of color material allowable in printing colors represented by the second color data. Also, since the second color data is corrected such that the total amount of color material for the second color data does not exceed the total allowable amount, it is possible to generate a color conversion table capable of appropriately limiting the total amount of color material, thereby suppressing deterioration of print quality.

Also, the present invention can be implemented in various forms such as a device for generating a color conversion table, a computer program for implementing the functions or methods of the devices, and non-transitory recording medium having the computer programs stored therein.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

A. First Illustrative Embodiment

A-1. Configuration of Printing System

Figure 1:
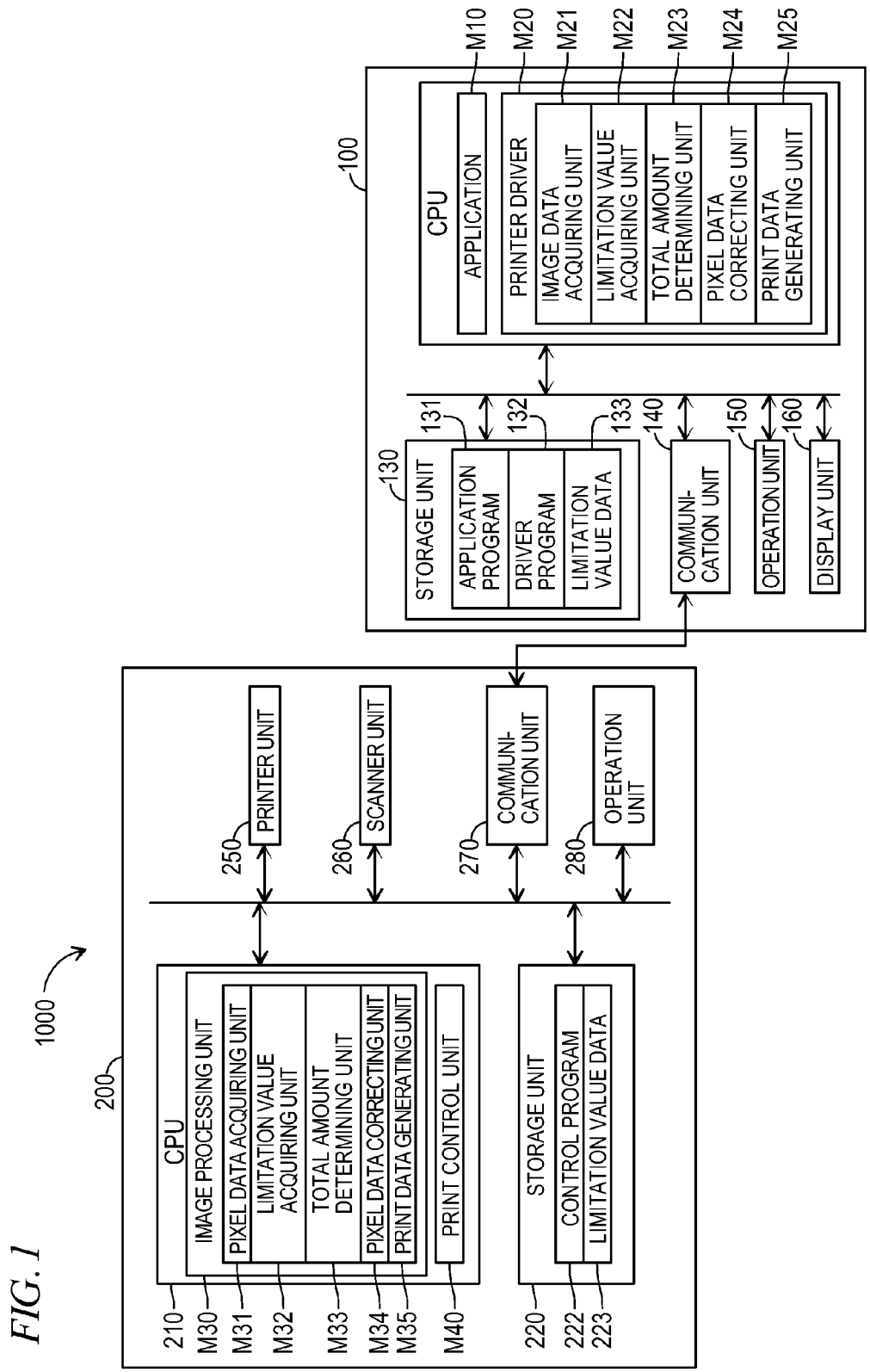
FIG. 1 is a block diagram showing the configuration of a printing system.

Hereinafter, an illustrative embodiment of the present invention will be described. FIG. 1 is a block diagram showing the configuration of a printing system according to a first illustrative embodiment. As shown in FIG. 1, a printing system 1000 includes a personal computer 100 and a multi-function apparatus 200.

The personal computer 100 includes a CPU 110, a storage unit 130 such as a ROM, a RAM, or a hard disk, a communication unit 140 including an interface for connection with an external apparatus, an operation unit 150 such as a mouse and a keyboard, and a display unit 160 such as a display. The communication unit 140 performs data communication with an external apparatus. For example, the communication unit 140 receives image data from a digital camera (not shown) or supplies print data to the multi-function apparatus 200.

The storage unit 130 stores application programs 131 for generating documents and images, a driver program 132, and limitation value data 133.

The CPU 110 executes the application programs 131, thereby implementing functions of an application M10 such as generation of documents and images, and executes the driver program 132, thereby implementing functions of a printer driver M20. The printer driver M20 acquires image data representing a print target image from the application M10, generates print data, and supplies the generated print data to the multi-function apparatus 200. The printer driver M20 includes an image data acquiring unit M21, a limitation value acquiring unit M22, a total amount determining unit M23, a pixel data correcting unit M24, and a print data generating unit M25. Operations of these functional units M21 to M25 will be described below.

The multi-function apparatus 200 includes a CPU 210 which controls the entire multi-function apparatus 200, a storage unit 220 such as a ROM, a RAM, or a hard disk, an inkjet type printer unit 250, a flatbed type scanner unit 260, a communication unit 270 including an interface for connection with a computing device such as the personal computer 100 or a storage device such as a USB memory, and an operation unit 280 including an operation panel and various buttons. The communication unit 270 performs data communication with a computing device or a storage device connected to the interface of the communication unit 270. For example, the communication unit 270 receives print data from the personal computer 100 or receives image data representing an image from a USB memory.

The storage unit 220 stores various programs for implementing various functional units for controlling the multi-function apparatus 200. Herein, FIG. 1 selectively shows functional units necessary for describing the present illustrative embodiment. The storage unit 220 stores a control program 222 and limitation value data 223. In the meantime, the driver program 132, the control program 222, and the limitation value data 133, 223 may be provided in a form of being stored in computer-readable recording media such as semiconductor memories (such as ROMs, RAMs, and flash memories) and magnetic memory media (such as CD-ROMs and hard disks).

The CPU 210 executes the control program 222, thereby implementing functions of controlling the multi-function apparatus 200. For example, the CPU 210 implements functions of an image processing unit M30 and functions of a print control unit M40.

The image processing unit M30 generates print data using print target image data acquired from a computing device or a storage device connected to the interface of the communication unit 270, and supplies the print data to the print control unit M40. The image processing unit M30 includes a pixel data acquiring unit M31, a limitation value acquiring unit M32, a total amount determining unit M33, a pixel data correcting unit M34, and a print data generating unit M35. The functions of the functional units M31 to M35 of the image processing unit M30 are the same as the functions of the above-described functional units M21 to M25 with the same names included in the printer driver M20 of the personal computer 100. If print data is supplied from the printer driver M20 of the personal computer 100, the print data is supplied to the print control unit M40 without passing through the image processing unit M30.

The print control unit M40 controls the printer unit 250 based on print data supplied from the image processing unit M30 or print data supplied from the printer driver M20 of the personal computer 100, so that printing is performed.

The printer unit 250 performs printing on a print medium using a plurality of kinds of ink based on control of the print control unit M40. Specifically, the printer unit 250 is a printing mechanism which ejects ink of cyan (C), magenta (M), yellow (Y), and black (K), thereby performing printing.

In the meantime, the print control unit M40 and the printer unit 250 correspond to a print performing unit according to an illustrative embodiment. Each of the personal computer 100 and the CPU 210 of the multi-function apparatus 200 corresponds to a print data generating device according to an illustrative embodiment.

The limitation value data 133 stored in the storage unit 130 of the personal computer 100 and the limitation value data 223 stored in the storage unit 220 of the multi-function apparatus 200 are the same data. The limitation value data will be described later when describing image processing.

A-2: Image Processing

Figure 2:
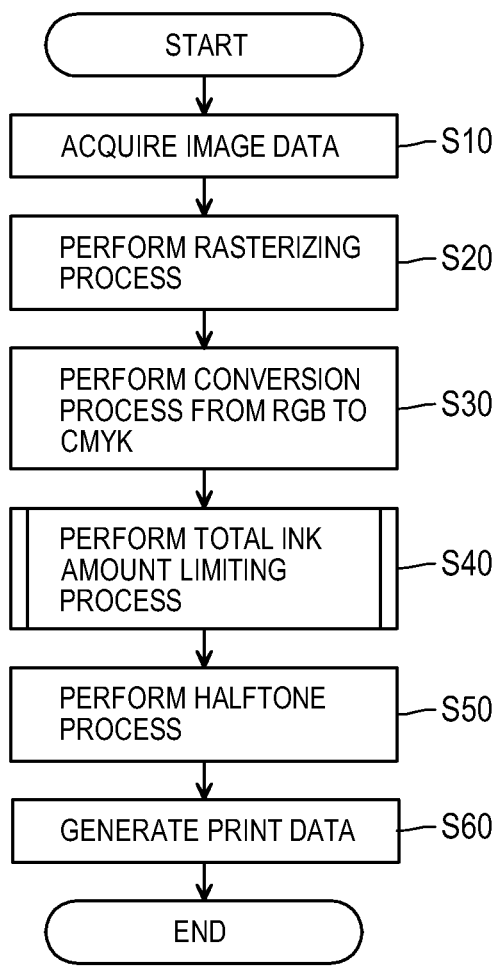
FIG. 2 is a flow chart showing operation steps of image processing.

FIG. 2 is a flow chart showing operation steps of image processing performed by the printer driver M20 (FIG. 1) of the personal computer 100. This image processing is performed, for example, in response to receiving a print request of a print target image from a user. The image processing may be also performed in response to receiving a print preview display request of a print target image from the user.

In Step S10, the printer driver M20 acquires image data representing a print target image from the application M10. This image data may include bitmap data, vector data representing figures or the like in a planar coordinate system, data having literal information and the positions of letters.

In Step S20, the printer driver M20 performs a rasterizing process of converting the image data representing the print target image into bitmap data. Pixel data configuring the bitmap data are RGB pixel data in which the color of each pixel is represented by the grayscale values (for example, 256 grayscale levels) of three components of red (R), green (G), and blue (B).

In Step S30, the printer driver M20 performs a color conversion process of converting the RGB pixel data configuring the bitmap data into CMYK pixel data in which the color of each pixel is represented by the grayscale values (256 grayscale levels in the present illustrative embodiment) of color components corresponding to ink colors to be used for printing, that is, four color components of cyan (C), magenta (M), yellow (Y), and black (K). The color conversion process is performed using a lookup table which associates the RGB pixel data with the CMYK pixel data.

In Step S40, the printer driver M20 performs a total ink amount limiting process on the CMYK pixel data configuring the bitmap data. The total ink amount limiting process is a process of correcting the CMYK pixel data such that an ink amount required for printing becomes equal to or less than a reference amount. Here, the CMYK pixel data after the total ink amount limiting process is also referred to as corrected CMYK pixel data. The total ink amount limiting process is performed for suppressing defects due to an excessive ink amount during printing. Specific examples of the defects include bleeding, mottle (color unevenness occurring due to ink not absorbed by a print medium and gathered), strike-through (a phenomenon in which ink ejected onto the front side of a print medium soaks through the print medium toward the back side), a deformation of a print medium and the like. The total ink amount limiting process will be described later.

In Step S50, the print data generating unit M25 of the printer driver M20 performs a halftone process of converting the bitmap data configured by the corrected CMYK pixel data into dot data representing the dot formation states of the respective pixels.

In Step S60, the print data generating unit M25 rearranges the dot data into an order to be used in printing and adds various printer control codes and a data identification code, thereby generating print data which can be interpreted by the print control unit M40 of the multi-function apparatus 200.

The print data generated in Step S60 is supplied to the multi-function apparatus 200. As a result, in the multi-function apparatus 200, printing of the print target image is performed.

Figure 3:
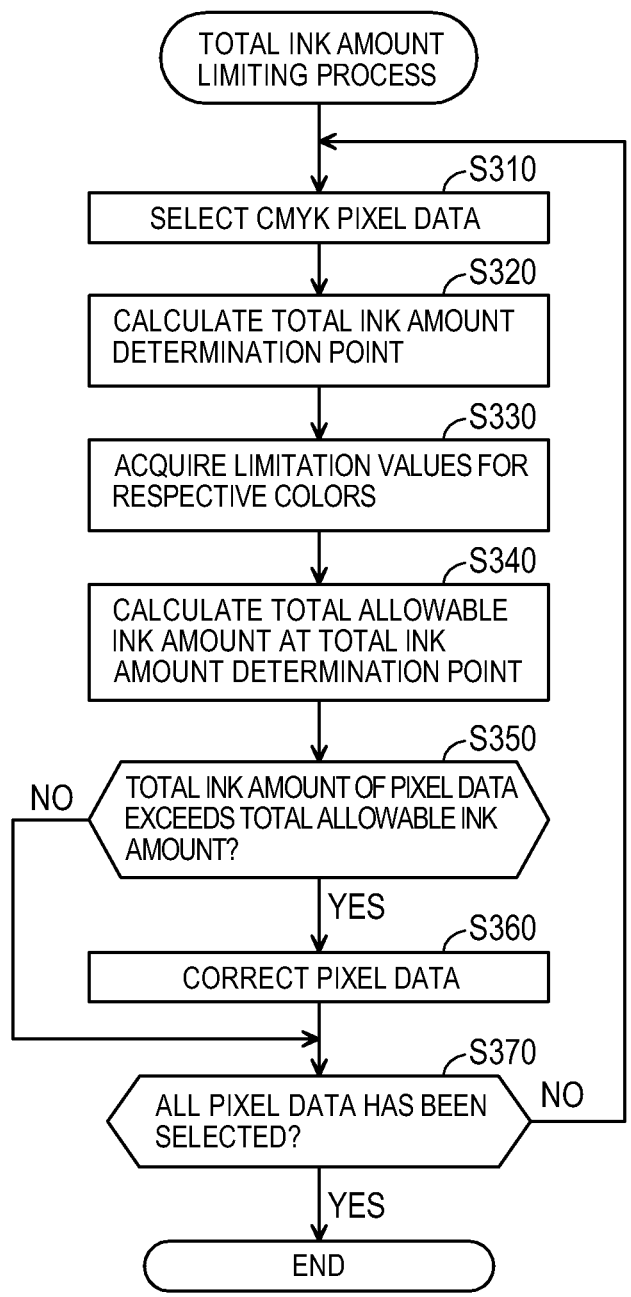
FIG. 3 is a flow chart showing operation steps of a total ink amount limiting process.
Figure 4A:
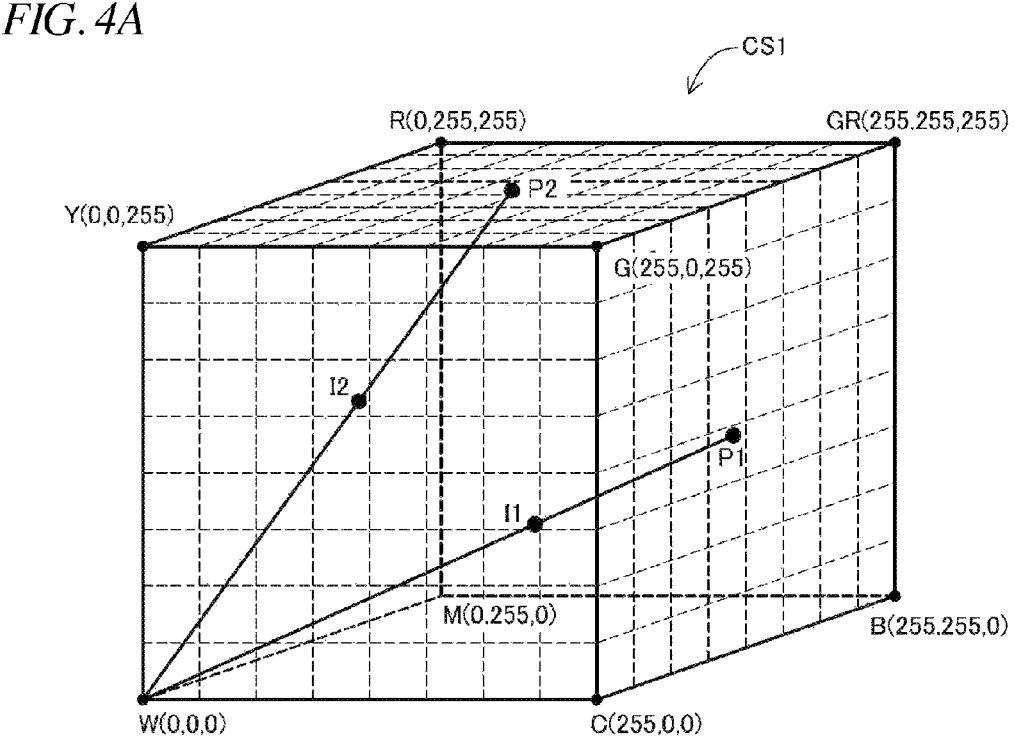
FIGS. 4A and 4B are explanatory views showing the total ink amount limiting process.
Figure 4B:
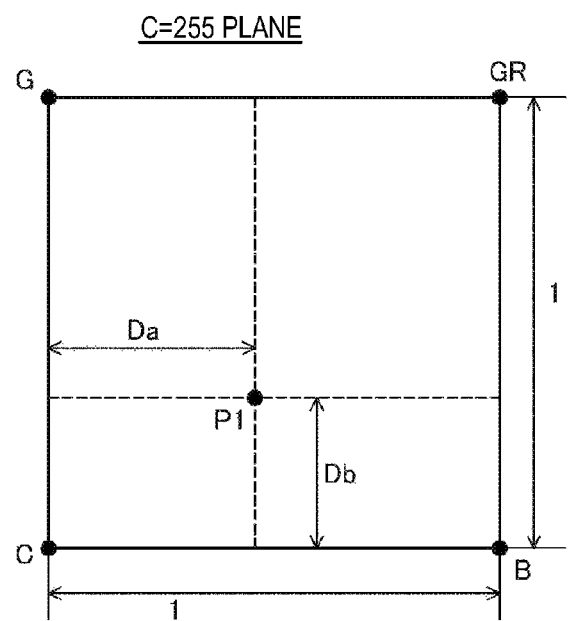

Next, the specific operations of the total ink amount limiting process will be described. FIG. 3 is a flow chart showing operation steps of the total ink amount limiting process. FIGS. 4A and 4B are explanatory views showing the total ink amount limiting process.

In Step S310, the image data acquiring unit M21 selects and acquires a CMYK pixel data as a process target (target CMYK pixel data) from plural pieces of CMYK pixel data configuring the bitmap data (image data). Here, the grayscale values (component values) of four color components of C, M, Y, and K configuring each CMYK pixel data are also referred to as a C value, an M value, a Y value, and a K value, respectively.

In Step S320, the total amount determining unit M23 calculates a total ink amount determination point of the target CMYK pixel data. FIG. 4A shows a CMY color space CS1 represented by three-dimensional orthogonal coordinates having, as coordinate axes, components of three colors C, M, and Y out of the components of four colors included in the CMYK pixel data, except for K components. Here, a combination of a C value, an M value, and a Y value included in each CMYK pixel data is also referred to as a CMY value. In FIG. 4A, a point 'C' (cyan point), a point 'M' (magenta point), a point 'Y' (yellow point), and a point 'W' (white point) have CMY values (255, 0, 0), (0, 255, 0), (0, 0, 255), and (0, 0, 0), respectively. Also, a point 'GR' (gray point), a point a' (red point), a point 'G' (green point), and a point 'B' (blue point) have CMY values (255, 255, 255), (0, 255, 255), (255, 0, 255), and (255, 255, 0), respectively.

The total ink amount determination point is an intersection between a color gamut surface of the CMY color space CS1 and a straight line passing the point "W" (white point) and the position of the CMY value of the target CMYK pixel data. For example, if the position of the CMY value of the target CMYK pixel data is a point I1 shown in FIG. 4A, the total ink amount determination point is a point P1 on a color gamut surface (surface on which C value is 225) shown in FIG. 4A. Also, if the position of the CMY value of the target CMYK pixel data is a point 12 shown in FIG. 4A, the total ink amount determination point is a point P2 on a color gamut surface (surface on which Y value is 225) shown in FIG. 4A.

In Step S330, the limitation value acquiring unit M22 acquires color specific limitation values for respective colors corresponding to the K value of the target CMYK pixel data while referencing the limitation value data 133 stored in the storage unit 130.

Figures 5, 6:
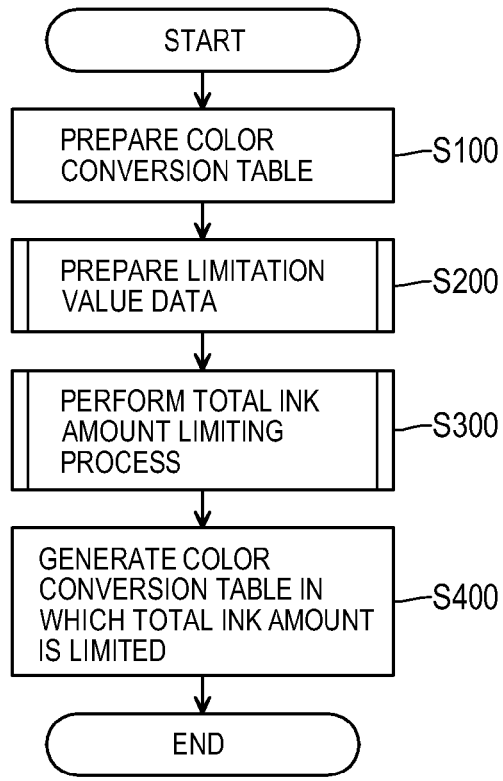
FIG. 5 is a conceptual view showing contents of limitation value data.
FIG. 6 is a flow chart showing a method of generating a color conversion table.

FIG. 5 is a conceptual view showing the contents of the limitation value data 133. The limitation value data 133 defines limitation values for respective colors with respect to a plurality of K values. The limitation values include seven kinds of limitation values for seven vertexes, that is, the point 'C', the point 'M', the point 'Y', the point 'R', the point 'G', the point 'B', and the point 'GR' out of eighth vertexes of the rectangular parallelepiped representing the color gamut of the CMY color space CS1, except for the point 'W'. Each set of seven kinds of limitation values corresponds to one of a plurality of representative values of the K value (also referred to as representative K values which are 0, 64, 128, 192, and 255 in the present illustrative embodiment). Among the seven kinds of limitation values, three limitation values Clim, Mlim, and Ylim corresponding to the point 'C', the point 'M', and the point 'Y' are single-color limitation values for C, M, and Y color components representing ink colors. Also, three limitation values Rlim, Glim, and Blim corresponding to the point 'R', the point 'G', and the point 'B' are two-color-combination limitation values for combinations R (M+Y), G (C+Y), and B (C+M) of two color components representing the ink colors. A color limitation value GRlim corresponding to the point 'GR' is a three-color-combination limitation value for a combination GR (C+M+Y) of three color components representing the ink colors.

The limitation values defined in the limitation value data 133 are determined according to fixing characteristics of corresponding kinds of ink to a print medium (for example, a sheet). Specifically, the limitation values are determined based on results obtained by inspecting and observing a printed matter obtained by actually printing an image on a sheet with the printer unit 250 of the multi-function apparatus

200. A more specific method of determining the limitation values for respective colors will be described in a second illustrative embodiment.

If the K value (target K value) of the target CMYK pixel data is any one of the representative K values, the limitation value acquiring unit M22 acquires a set of limitation values corresponding to the representative K value. If the target K value is not any one of the representative K values, the limitation value acquiring unit M22 selects two representative K values. Specifically, the limitation value acquiring unit M22 selects an upper-side representative K value closest to the target K value from representative K values larger than the target K value, and selects a lower-side representative K value closest to the target K value from representative K values smaller than the target K value. Then, the limitation value acquiring unit M22 calculates limitation values for respective colors to be used (limitation values corresponding to the target K value) by linear interpolation using two sets of limitation values corresponding to the two selected representative K values.

More specifically, the limitation value Clims for C component corresponding to the target K value is calculated using the following Equation (1).

$$Clims=(Ks-Kb)/(Ku-Kb)\times Climu+(Ku-Ks)/(Ku-Kb)\times Climb \quad (1)$$

wherein Ks represents the target K value, Kb represents the lower-side representative K value, Ku represents the upper-side representative K value, Climu represents a limitation value for C component corresponding to the upper-side representative K value, and Climb represents a limitation value for C component corresponding to the lower-side representative K value.

Here, the limitation value acquiring unit M22 does not need to acquire all of the seven kinds of limitation values, and needs only to acquire the limitation values corresponding to four vertexes of a color gamut surface on which the total ink amount determination point is positioned. For example, if the point P1 positioned on the color gamut surface on which the C value is 255 as shown in FIG. 4B is the total ink amount determination point, the limitation value acquiring unit M22 acquires limitation values Glims, Clims, Blims, and GRlims corresponding to four vertexes (the point 'G', the point 'C', the point 'B', and the point 'GR') of the color gamut surface on which the C value is 255.

In Step S340, the total amount determining unit M23 calculates a total allowable ink amount using the acquired limitation values for respective colors. The total allowable ink amount is a total ink amount allowable in printing a color represented by the target CMYK pixel data. Specifically, the total amount determining unit M23 calculates the total allowable ink amount by interpolation (area interpolation in the present illustrative embodiment) based on the position of the total ink amount determination point on the color gamut surface and limitation values corresponding to the vertexes of the color gamut surface on which the total ink amount determination point is positioned. For example, the case where the point P1 shown in FIG. 4B is the total ink amount determination point will be described. Herein, it is assumed a case where the length of each side of the CMY color space CS1 is 1, a distance between a side G-C and the total ink amount determination point P1 is Da, and a distance between a side C-B and the total ink amount determination point P1 is Db. In this case, a total allowable ink amount LM can be calculated using the following Equation (2) based on the distances Da and Db and the limitation values Glims, Clims, Blims, and GRlims for four colors acquired in Step S330.

$$LM=(1-Da)\times Db\times Glims+(1-Da)\times(1-Db)\times Clims+Da\times(1-Db)\times Blims+Da\times Db\times GRlims \quad (2)$$

In Step S350, the pixel data correcting unit M24 determines whether a total ink amount MTa (represented as the sum of the C, M, Y, and K component values) of the target CMYK pixel data exceeds the calculated total allowable ink amount LM. If the total ink amount MTa is equal to or less than the total allowable ink amount LM (NO in Step S350), the pixel data correcting unit M24 does not correct the target CMYK pixel data, and the process proceeds to Step S370.

If the total ink amount MTa exceeds the total allowable ink amount LM (YES in Step S350), in Step S360, the pixel data correcting unit M24 corrects the target CMYK pixel data such that an total ink amount MTb of a corrected CMYK pixel data does not exceed the total allowable ink amount LM. The pixel data correcting unit M24 performs the correction by reducing the C value, the M value, and the Y value, without changing the K value of the target CMYK pixel data such that the sum of the K value, the C value, the M value, and the Y value becomes equal to or less than the total allowable ink amount LM. More specifically, the pixel data correcting unit M24 reduces each of the C value, the M value, and the Y value while maintaining the ratio among the C value, the M value, and the Y value.

In Step S370, the printer driver M20 determines whether all of the CMYK pixel data included in the image data have been selected as the process target. If all of the CMYK pixel data have not been selected as the process target (NO in Step S370), the printer driver M20 returns to Step S310 in which the printer driver M20 selects another CMYK pixel data having not been selected as the process target, and then iterates the above-described operations of Steps S320 to S360. If all of the CMYK pixel data have been selected as the process target (YES in Step S370), the printer driver M20 ends the total ink amount limiting process.

According to the above-described first illustrative embodiment, the limitation values for respective colors determined according to the fixing characteristics of the ink to the print medium are used to determine the total allowable ink amount LM which is allowable in printing a color represented by each CMYK pixel data. Also, each CMYK pixel data is corrected such that the total ink amount based on the CMYK pixel data does not exceed the total allowable ink amount LM. As a result, it is possible to appropriately limit the ink, thereby suppressing deterioration of print quality.

More specifically, a plurality of kinds of ink (C, M, Y, and K) may be different in the fixing characteristics (for example, how easy solvents of the plurality of kinds of inks are dried and how easy the solvents are absorbed by print media) due to differences in the solvents and solutes (coloring substances) of the plurality of kinds of inks. Also, mixtures of two kinds of ink may be different in the fixing characteristics of ink combinations. For example, a case where the fixing characteristic of each kind of ink is not considered will be explained while assuming that C ink is more superior than M ink in the drying characteristic and absorbability, and that an allowable amount of the C ink is larger than an allowable amount of the M ink. In this case, for example, if the fixing characteristics of the C ink and the M ink are not considered and if printing colors in which a use amount of the C ink is larger than a use amount of the M ink, the use amount of the C ink may be excessively suppressed. Then, the color range expressible by the printer unit 250 may be narrowed. In contrast, in a case of printing colors in which the use amount of the M ink is larger than the use amount of the C ink, limitation may be not sufficient, and thus defects (the above-described bleeding, mottle, and the like) due to an excessive ink amount may occur. However, according to the above-described illustrative embodiment, since the limitation values determined according to the fixing characteristics of ink are used, it is possible to suppress the range of expressible colors from being narrowed due to excessive limitation on the ink amount while reducing defects (the above-described bleeding, mottle, and the like) due to an excessive ink amount.

Also, according to the above-described first illustrative embodiment, the total allowable ink amount LM is determined using limitation values for colors corresponding to C, M, and Y, that is, the single-color limitation values corresponding to single colors of ink to be used, and limitation values for colors corresponding to R, G, B, and GR, that is, combination limitation values corresponding to combinations of two or more kinds of ink selected from C, M, Y, and M ink to be used. As a result, it is possible to more appropriately suppress the total ink amount, thereby suppressing deterioration of print quality. For example, on print media, the fixing characteristics may depend on ink combinations such as a change in cases of ink mixtures. However, according to the present illustrative embodiment, since the combination limitation values determined according to the fixing characteristics are used, it is possible to implement appropriate limitation on the total ink amount.

Further, according to the above-described illustrative embodiment, the intersection of a color gamut surface of the CMY color space CS1 and the straight line passing the point 'W' (white point) and the position (the position of the CMY value) of the target CMYK pixel data is calculated, and the limitation value at the intersection is calculated by interpolation using the single-color limitation values corresponding to the vertexes of the color gamut surface and combination limitation values for combinations of the color components corresponding to the vertexes of the color gamut surface. Then, the limitation value at the intersection is determined as the total allowable ink amount LM of the corresponding CMYK pixel data. As a result, it is possible to calculate an appropriate total allowable ink amount LM according to the position of the CMY value of the CMYK pixel data in the CMY color space. More specifically, it can be said that the straight line passing the white point and the position of the CMYK pixel data (the position of the CMY value) is a straight line according to the ratio of the C, M, and Y component values. Therefore, since the total allowable ink amount LM is calculated by interpolation with respect to the intersection of the straight line and the color gamut surface, it is possible to easily calculate the total allowable ink amount LM according to the ratio of the C, M, and Y component values. In a case where the fixing characteristics of the plurality of kinds of ink are different, it is possible that even if the same ink amount is used for CMYK pixel data, the total allowable ink amounts LM are different according to the ratios of C, M, and Y components. However, according to the first illustrative embodiment, it is possible to appropriately limit the total ink amount according to the ratio of C, M, and Y components of each CMYK pixel data.

Also, in the above-described illustrative embodiment, a plurality of sets of limitation values corresponding to a plurality of representative K values is provided in the limitation value data 133. Then, the limitation values for colors to be used are calculated by interpolation according to the K value of the target CMYK pixel data.

As a result, it is possible to calculate an appropriate total allowable ink amount LM according to not only the ratio of C, M, and Y components but also a ratio of four component values of C, M, Y, and K.

B. Second Illustrative Embodiment

In the above-described first illustrative embodiment, the printer driver M20 of the personal computer 100 or the image processing unit M30 of the multi-function apparatus 200 performs limitation on the ink amount during printing. However, in a second illustrative embodiment, there will be described a method of generating a color conversion table (lookup table) for converting RGB pixel data into CMYK pixel data while appropriately limiting the ink amount. The generation of the color conversion table is performed, for example, by the manufacturer of a multi-function apparatus or a printer.

FIG. 6 is a flow chart showing a method of generating a color conversion table. First, in Step S100, a color conversion table is prepared, which is used as a reference before the total ink amount limiting process is performed.

Figures 7A, 7B:
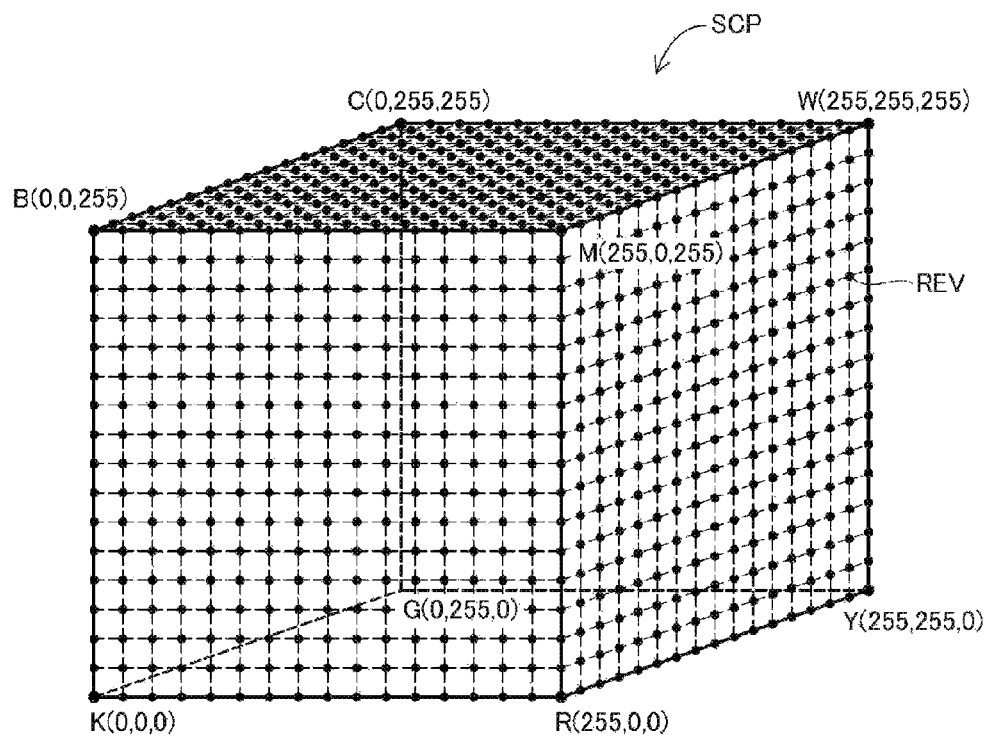
FIGS. 7A and 7B are views showing an example of the color conversion table.

FIGS. 7A and 7B are views showing an example of the color conversion table. FIG. 7A conceptually shows a color conversion table PFD. As shown in FIG. 7A, the color conversion table PFD is a table in which each of N-number of RGB color data having numbers of 1 to N is associated with a CMYK pixel data representing a color represented by the corresponding RGB color data in a CMYK color space having a plurality of kinds of ink (C, M, Y, and K ink) to be used in the printer unit 250 as color components. Also, the N-number of RGB color data having the numbers of 1 to N are also referred as representative color data REV of the RGB color data, or more simply referred to as representative color data REV. In the present illustrative embodiment, the R, G, and B values of each RGB color data and the C, M, Y, and K values of each CMYK pixel data are represented in 256 grayscale levels.

The N-number of representative color data items REV of the color conversion table PFD have R, G, and B values each of which is set by a predetermined number 'n' provided at almost regular intervals between 0 to 255. In the present illustrative embodiment, the predetermined number 'n' is 17. In this case, the number 'N' of the representative color data items REV is 4913 (=17×17×17). FIG. 7B conceptually shows the positions of the representative color data REV in an RGB color space SCP.

In Step S200, limitation value data are prepared. Here, the limitation value data to be prepared is the same as the limitation value data 133 and 233 (FIG. 5) of the first illustrative embodiment.

Figure 8:
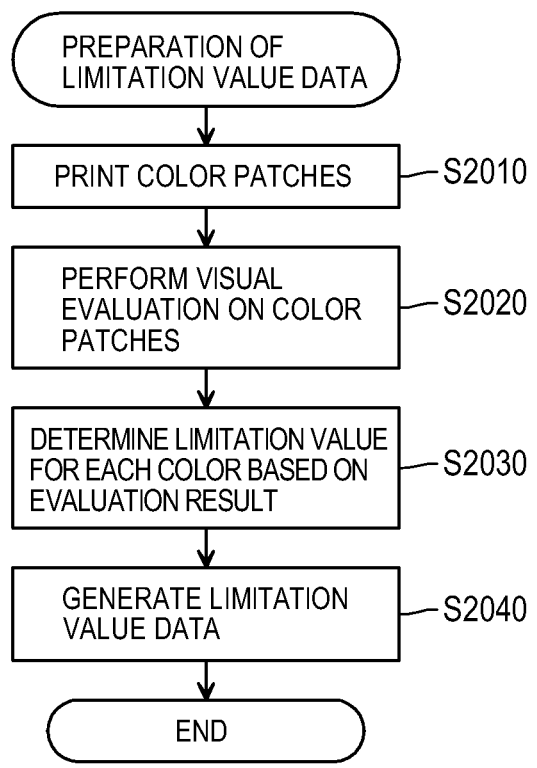
FIG. 8 is a flow chart showing a process of preparing the limitation value data.

FIG. 8 is a flow chart showing a process of preparing the limitation value data. In step S2010, a plurality of color patches CP are printed using a printer which will use the color conversion table to be generated.

Figure 9:
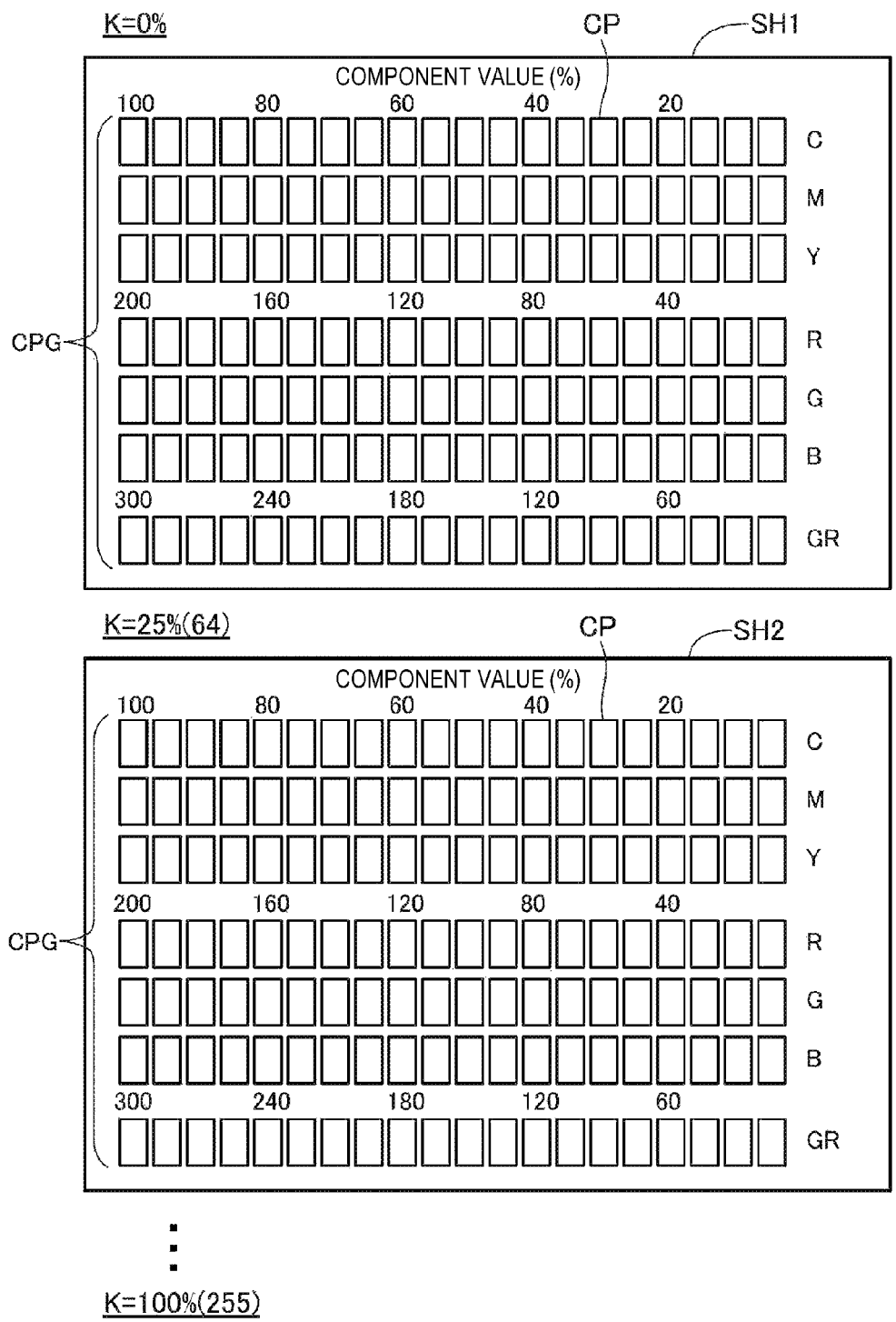
FIG. 9 is a view showing printed sheet having a plurality of color patches printed.

FIG. 9 is a view showing printed sheets obtained by printing the plurality of color patches CP. In the present illustrative embodiment, color patch groups CPG are printed, which includes colors belonging to CMYK pixel data groups obtained by varying C, M, and Y values with the K values being fixed. The color patch groups CPG are printed with respect to each of a plurality of representative K values (0%, 25% (64), 50% (128), 75% (192), and 100% (255)). FIG. 9 shows a printed sheet SH1 obtained by printing a color patch group CPG having K values fixed to 0, and a printed sheet SH2 obtained by printing a color patch group CPG having K values fixed to 25% (64).

One color patch group CPG includes three single-color patch groups, that is, C, M, and Y patch groups, three two-color-combination patch groups, that is, R (M+Y), G (C+Y), and B (C+M) patch groups, and a three-color-combination patch group, that is, a GR (C+M+Y) patch group.

The single-color patch groups are color patch groups obtained by printing using an amount of K ink represented by a representative K value and ink of any one of three chromatic colors (C, M, and Y). Each single-color patch group includes a plurality of color patches obtained by printing the colors of a plurality of CMYK pixel data which vary in the component values (256 grayscale levels) of chromatic color ink to be used, in a stepwise manner from 0% (0) to 100% (255). For example, the C, M, and Y values of the CMYK pixel data of the plurality of color patches belonging to the single-color patch group for C are (13, 0, 0), (26, 0, 0), . . . , and (255, 0, 0).

Each two-color-combination patch group is a color patch group obtained by printing using an amount of K ink represented by a representative K value and ink of two colors of the three chromatic colors (C, M, and Y). Each two-color-combination patch group includes a plurality of color patches obtained by printing the colors of a plurality of CMYK pixel data which vary in two component values corresponding to the two kinds of chromatic color ink to be used, in a stepwise manner between 0% to 100% while maintaining the two component values the same. For example, the CMY values of the CMYK pixel data of the plurality of color patches belonging to the two-color-combination patch group for R are (0, 13, 13), (0, 26, 26), . . . , and (0, 255, 255). In FIG. 9, the component value '200' of the leftmost color patch of each two-color combination patch group means that each of the component values of the two kinds of chromatic color ink to be used is 100%.

The three-color-combination patch group is a color patch group obtained by printing using an amount of K ink represented by a representative K value and all of three kinds of chromatic color ink (C, M, and Y). The three-color-combination patch group includes a plurality of color patches obtained by printing the colors of a plurality of CMYK pixel data which vary in three component values corresponding to the three kinds of chromatic color ink to be used, in a stepwise manner between 0% to 100% while maintaining the three corresponding component values the same. For example, the CMY values of the CMYK pixel data of the plurality of color patches belonging to the three-color combination patch group are (13, 13, 13), (26, 26, 26), . . . , and (255, 255, 255). In FIG. 9, the component value '300' of the leftmost color patch of the three-color combination patch group means that each of the component values of the three kinds of chromatic color ink to be used is 100%.

In step S2020, the plurality of printed color patches CP is visually evaluated. Specifically, it is evaluated whether any defect such as mottle and bleeding occurs in each color patch with a specific K value fixed.

In step S2030, based on the results of the visual evaluation, limitation values for colors C, M, Y, R, G, B, and GR are determined for each representative K value. In other words, an upper limit ink amount (component value) within which any defect does not occur is determined for each of C, M, Y, R, G, B, and GR. For example, if the upper limit of the CMY values is determined to (0, 206, 206) as a result of visual evaluation on the two-color-combination color patches of R (M+Y) with K values fixed to 128, the upper limit ink amount is determined to the sum of the C, M, Y, and K values, that is, 540 (=0+206+206+128). This value is determined as a limitation value Rlim for R (see FIG. 5) in a case where the K value is 128.

In step S2040, limitation value data (see FIG. 5) defining limitation values for respective colors determined in step S2030 is generated.

If the limitation value data are prepared, in Step S300 of FIG. 6, the total ink amount limiting process is performed.

Figure 10:
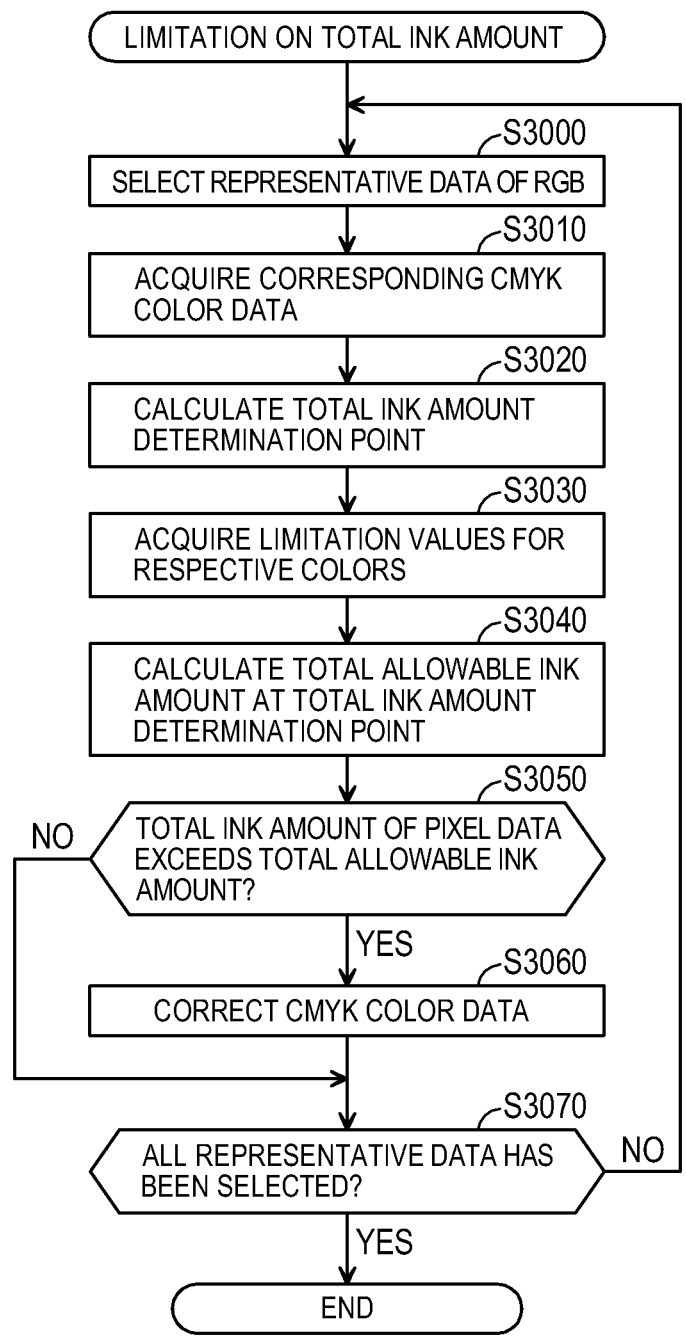
FIG. 10 is a flow chart showing a total ink amount limiting process.

FIG. 10 is a flow chart showing the total ink amount limiting process. A computing device (for example, a personal computer) performs the total ink amount limiting process, using the color conversion table prepared in Step S100 and the limitation value data prepared in Step S200.

In Step S3000, the computing device selects a representative color data REV of RGB included in the color conversion table. In Step S3010, the computing device acquires a CMYK pixel data corresponding to the selected representative color data REV in the color conversion table.

The computing device performs operations of Steps S3020 to S3060 on the target CMYK pixel data. The operations of Steps S3020 to S3060 are the same as the operations of Step S320 to S360 performed on the target CMYK pixel data in the total ink amount limiting process (FIG. 3) of the first illustrative embodiment, and thus will not be described.

In Step S3070, the computing device determines whether all representative color data REV included in the color conversion table have been selected as the process target. In a case where all representative color data REV have not been selected (NO in Step S3070), the computing device returns to Step S3010 in which the computing device selects another representative color data REV having not been selected as the process target, and then iterates the above-described operations of Steps S3020 to S3060.

In a case where all representative color data REV have been selected (YES in Step S3070), the computing device ends the total ink amount limiting process.

If the total ink amount limiting process ends, in Step S400 (FIG. 6), a color conversion table which associates each representative color data REV with a corrected CMYK color data while the total ink amount being limited.

If the color conversion table generated according to the second illustrative embodiment described above is used in a printing apparatus, even if the total ink amount limiting process is not performed in the printer driver M20 or the image processing unit M30 of the first illustrative embodiment, it is possible to appropriately limit the total ink amount, thereby suppressing deterioration of print quality, similarly to the first illustrative embodiment.

C. Modifications (1) In each of the above-described illustrative embodiments, limitation on the total ink amount is performed according to the fixing characteristics of a plurality of kinds of ink to be used in the inkjet type print performing unit. However, limitation on a total toner amount may be performed according to the fixing characteristics of a plurality of kinds of toner to be used in a laser type print performing unit. In the case of the laser type print performing unit, it is possible to implement appropriate limitation on the total toner amount so as not to narrow the range of expressible colors while reducing defects (for example, a deterioration in the image quality due to detachment of toner) due to an excessive toner amount.

(2) In each of the above-described illustrative embodiments, as the plurality of kinds of ink, ink of four colors C, M, Y, and K is used. However, for example, ink of six colors including light cyan LC and light magenta LM in addition to the four colors may be used. In this case, it is necessary only to limit the total ink amount based on color data having six color components, using limitation value data defining limitation values for each of five chromatic colors and each of combinations of the five chromatic colors. Also, ink of only three colors C, M, and Y may be used, without using achromatic color ink. In this case, unlike in the above-described illustrative embodiments, the limitation value data does not need to include sets of limitation values for respective colors with respect to a plurality of representative K values, and needs only to include one set of limitation values for respective colors.

(3) In the above-described second illustrative embodiment, the color conversion table for converting RGB color data into CMYK color data is generated. However, a color conversion table for converting color data represented in another arbitrary color system (for example, a CIELAB color system, a CIEXYZ color system, or a CIELUV color system, which are an apparatus-independent color system) into CMYK color data may be generated.

(4) In the above-described second illustrative embodiment, the limitation values for respective colors are determined by visually observing the printed matter of color patches. However, the present invention is not limited thereto. If the limitation values for respective colors depend on the actual fixing characteristics of ink, the limitation values may be determined by other methods. For example, parameters for each kind of ink may be determined by experimentally or theoretically quantifying how easy a solvent of the ink is dried and how easy the ink is absorbed by a sheet. Then, a common reference limitation value may be corrected according to those parameters, whereby the limitation values for colors may be calculated.

(5) In the above-described first illustrative embodiment, the method of correcting the CMYK pixel data (the method of changing the K value without changing the ratio of C, M, and Y values) such that the total ink amount does not exceed the total allowable ink amount LM is just an example, and the present invention is not limited thereto. For example, a method of reducing a specific value of the C, M, and Y values and increasing the K value by a value corresponding to the reduction in the specific value, and various methods of reducing the total ink amount based on CMYK pixel data may be used.

(6) The limitation value data (limitation values for respective colors) of each of the above-described illustrative embodiments may be prepared for each kind of print media. For example, the limitation value data may be prepared for each kind of print media such as plain paper, glossy paper, matte paper, and recording media (such as CD-Rs). In this case, the printer driver M20 or the image processing unit M30 may determine the kind of print media based on input of the user, a paper kind sensor provided in a printer, or the like, and use limitation value data corresponding to the print media. It is preferable to generate the limitation value data for each kind of print media by printing color patches CP (FIG. 9) on each kind of print media and evaluating the print results of each kind of print media. The fixing characteristic of ink may depend on the kind of print media. According to this modification, since it is possible to consider the fixing characteristics of ink depending on the kinds of print media, it is possible to acquire a more appropriate total allowable ink amount LM. As a result, it is possible to more appropriately limiting the ink amount, thereby suppressing deterioration of print quality.

(7) In the above-described first illustrative embodiment, a portion of a configuration implemented by hardware may be replaced with software, whereas a portion of a configuration implemented by software may be replaced with hardware.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A print data generating device configured to generate print data for a print performing unit which is configured to perform printing on a print medium using a plurality of kinds of color material, the print data generating device comprising:
   a processor; and
   a memory storing computer-readable instructions therein, the computer-readable instructions, when executed by the processor, causing the print data generating device to perform:
      acquiring pixel data which configures image data representing a print image and which includes grayscale values of a plurality of color components corresponding to the plurality of kinds of color material;
      acquiring a plurality of limitation values which are determined for the plurality of color components included in the pixel data, respectively, and which are determined according to fixing characteristics of color material corresponding to the respective color components, to the print medium;
      determining a total allowable amount using the plurality of limitation values, the total allowable amount being a total amount of color material allowable in printing a color represented by the pixel data;
      if a total amount of color material for the pixel data exceeds the total allowable amount, correcting the pixel data such that the total amount of color material for the pixel data does not exceed the total allowable amount; and
      generating the print data for printing the print image while using the corrected pixel data.

2. The print data generating device according to claim 1, wherein the plurality of limitation values include a single-color limitation value determined for each of the plurality of color components, and a combination limitation value determined for each combination of two or more of the plurality of color components, and
   wherein the determining determines the total allowable amount using the single-color limitation value and the combination limitation value.

3. The print data generating device according to claim 1, wherein the determining determines the total allowable amount according to a ratio of the grayscale values of the plurality of color components included in the pixel data.

4. The print data generating device according to claim 2, wherein the plurality of color components of the pixel data include at least three color components corresponding to a CMY color space, and
   wherein the determining includes:
      calculating an intersection between a color gamut surface of the CMY color space and a straight line passing a white point in the CMY color space and a position of the pixel data in the CMY color space; and
      calculating a limitation value at the intersection by interpolation, the interpolation using the single-color limitation value of the color component corresponding to a vertex of the color gamut surface and the combination limitation value for the combination of the color components corresponding to a vertex of the color gamut surface,
   wherein the determining determines the limitation value at the intersection as the total allowable amount for the pixel data.

5. The print data generating device according to claim 1, wherein a set of the plurality of limitation values is provided for each of a plurality of kinds of print media, and wherein the computer-readable instructions, when executed by the processor, further cause the print data generating device to perform:
determining a kind of the print media, and
wherein the acquiring of the plurality of limitation values includes acquiring the plurality of limitation values based on the kind of the print media.

6. A method of generating a color conversion table for a print performing unit which is configured to perform printing on a print medium using a plurality of kinds of color material, the method comprising:
(a) preparing, by a processor of a print data generating device, correspondence data in which each of a plurality of first color data represented in a first color system is associated with second color data including grayscale values of a plurality of color components corresponding to the plurality of color material;
(b) preparing, by the processor, a plurality of limitation values which are determined for the plurality of color components included in the second color data, respectively, and which are determined according to fixing characteristics of color material corresponding to the respective color components, to the print medium;
(c) determining, by the processor, a total allowable amount using the plurality of limitation values, the total allowable amount being a total amount of color material allowable in printing a color represented by the second color data;
(d) if a total amount of color material for the second color data exceeds the total allowable amount, correcting the second color data by the processor such that the total amount of color material for the second color data does not exceed the total allowable amount; and
(e) generating, in the print data generating device, corrected correspondence data by correcting the correspondence data while using the corrected second data.

7. The method according to claim 6,
wherein the plurality of limitation values include a single-color limitation value determined for each of the plurality of color components, and a combination limitation value determined for each combination of two or more of the plurality of color components, and
wherein the determining (c) determines the total allowable amount using the single-color limitation value and the combination limitation value.

8. The method according to claim 7,
wherein the preparing (b) includes:
(b-1) printing a plurality of single-color patches corresponding to grayscale values of a plurality of levels of each color component, using color material corresponding to the color component,
(b-2) printing a plurality of combined-color patches corresponding to grayscale values of a plurality of levels of each combined-color component, using combination of color material corresponding to the color components,
(b-3) determining the single-color limitation value based on a print result of the single-color patches, and determining the combination limitation value based on a print result of the combined-color patches.

9. The method according to claim 6,
wherein the determining (c) determines the total allowable amount according to a ratio of the grayscale values of the plurality of color components included in the second color data.

10. The method according to claim 7,
wherein the plurality of color components of the second color data include at least three color components corresponding to a CMY color space, and
wherein the determining (c) includes:
(c-1) calculating an intersection between a color gamut surface of the CMY color space and a straight line passing a white point in the CMY color space and a position of the second color data in the CMY color space; and
(c-2) calculating a limitation value at the intersection by interpolation, the interpolation using the single-color limitation value of the color component corresponding to a vertex of the color gamut surface and the combination limitation value for the combination of the color components corresponding to a vertex of the color gamut surface, and
wherein the determining (c) determines the limitation value at the intersection as the total allowable amount for the second color data.

11. A non-transitory computer-readable storage medium storing computer-readable instructions for generating print data for a print performing unit which is configured to perform printing on a print medium using a plurality of kinds of color material, the instructions, when executed by a processor, causing a print data generating device to perform:
acquiring pixel data which configures image data representing a print image and which includes grayscale values of a plurality of color components corresponding to the plurality of kinds of color material;
acquiring a plurality of limitation values which are determined for the plurality of color components included in the pixel data, respectively, and which are determined according to fixing characteristics of color material corresponding to the respective color components, to the print medium;
determining a total allowable amount using the plurality of limitation values, the total allowable amount being a total amount of color material allowable in printing a color represented by the pixel data;
if a total amount of color material for the pixel data exceeds the total allowable amount, correcting the pixel data such that the total amount of color material for the pixel data does not exceed the total allowable amount; and
generating the print data for printing the print image while using the corrected pixel data.

* * * * *